United States Patent [19]

Rohrbaugh

[11] Patent Number: 5,025,424
[45] Date of Patent: Jun. 18, 1991

[54] SHOCK WAVE SCORING APPARATUS EMPLOYING CURVED ROD SENSORS

[76] Inventor: George W. Rohrbaugh, Rte. 1, Box 454, Alexandria, Pa. 16611

[21] Appl. No.: 527,057

[22] Filed: May 21, 1990

[51] Int. Cl.$^5$ .............................................. G01S 3/80
[52] U.S. Cl. .................................. 367/127; 367/129; 367/906; 273/372; 364/423; 235/400
[58] Field of Search .............. 367/127, 129, 140, 153, 367/906; 273/372; 364/423; 235/400, 411, 417

[56] References Cited
U.S. PATENT DOCUMENTS 3,778,059 12/1973 Rohrbaugh et al. ............ 367/906 X
4,351,026 9/1982 Phillips ........................... 367/906 X Primary Examiner—Brian S. Steinberger
Attorney, Agent, or Firm—Thomas E. Sterling

[57] ABSTRACT

This invention is an automatic gunnery system, responsive to airborne acoustic shock waves produced by a projectile passing through a target area. Curved elongated acoustic energy conductors are located adjacent to one side of said target area with acoustic transducers attached to the end portions thereof. Said transducers produce an electrical signal when a shock wave from the projectile reaches them through said energy conductors. Electrical signal from the transducers is connected to electronic circuitry which determines the location of each "hit" on or near the target which is registered on display means.

6 Claims, 4 Drawing Sheets

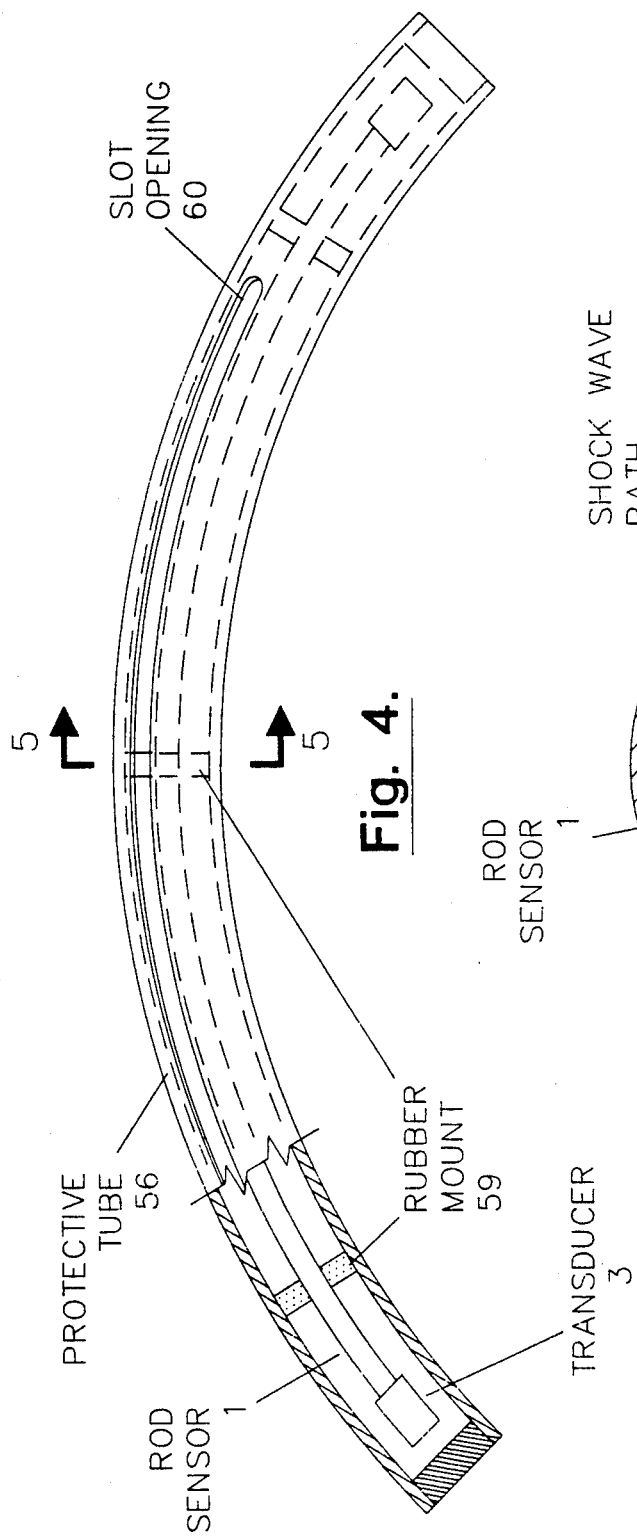
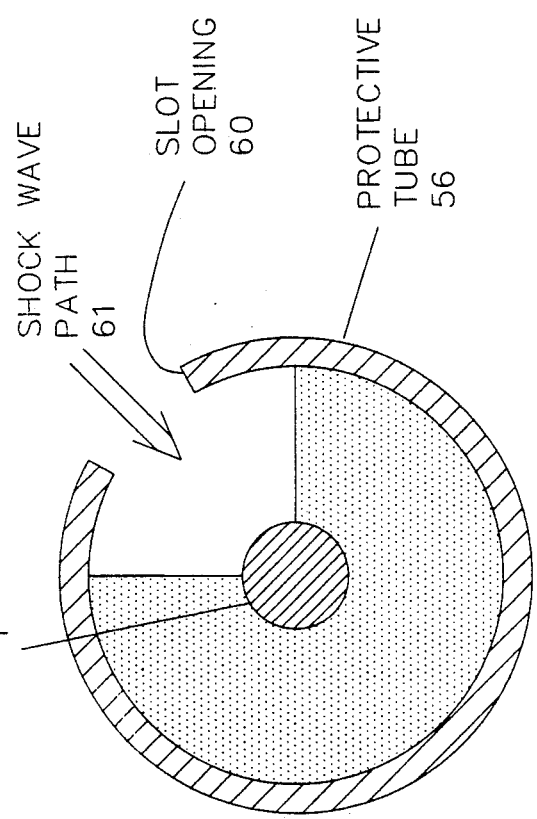

SHOCK WAVE SCORING APPARATUS EMPLOYING CURVED ROD SENSORS

The present application is an improvement on the invention in U.S. Pat. No. 3,778,059 by the present inventor and another. U.S. Pat. No. 3,778,059 is incorporated by reference in this present patent application.

BACKGROUND OF THE INVENTION

1. Field of the Invention

This invention relates to automatic shock wave scoring apparatus for scoring the "hit" on a supersonic projectile in a target area where the "hit" is determined from the detection of the acoustic ballistic shock wave. More particularly, this invention relates to the location and configuration of curved acoustic energy conductors (rod sensors) for detecting the ballistic shock wave where the rod sensors form a part of such automatic target scoring apparatus. This invention uses curved acoustic energy conductors to replace the mutually perpendicular acoustic energy conductors in said patent. These acoustic conductors are located only on one side of the target area. Radial lines from the center of curvature of the acoustic energy conductors intersect the target area and locate a "hit" when the projectile passes through the target area.

2. Discussion of Prior Art

Two basic methods are employed for determining the "hit" location of a supersonic projectile using the acoustic shock wave generated by the passing projectile. The first employs point sensors arrayed around or near the target area and calculates the projectile's location based on the arrival times of the shock wave at the various sensors. The time of arrival of the ballistic shock wave at each sensor, the locations of the sensors, the speed of sound in air, and the velocity of the projectile are used to make the calculation of the "hit" coordinates. Examples of this method of scoring supersonic projectiles are disclosed in U.S. Pat. No. 2,925,582 (Mattei) and U.S. Pat. No. 4,261,579 (Bowyer).

The second method employs mutually perpendicular metal rod sensors to detect the ballistic shock wave. The rod sensors are placed on the sides of the target area as disclosed in U.S. Pat. No. 3,778,059 (Rohrbaugh). The rod sensors replace the point sensors of the first method and determine the projectile's location based on the arrival times of the metalborne shock waves at transducers on the ends of the rod sensors. Only the speed of sound in the metal rods and the time of arrival of the shock waves at the transducers are needed to determine the "hit" coordinates. Since this new invention relates to the improvement of the scoring apparatus which uses the rod sensors, the following is an in-depth discussion of current target scoring which uses the metallic rod sensors.

The automatic gunnery system described in the Rohrbaugh patent detects the ballistic shock wave generated by a supersonic projectile with linear metallic acoustic rod sensors. The rod sensors, one vertical and one horizontal, are located on the perimeter of the target area to be defined. The two rod sensors are mutually perpendicular and describe an XY-coordinate grid within the target area. The ballistic shock wave from a supersonic projectile passing through the grid area impinges on the metallic rod sensors causing secondary acoustic shock waves to be generated in the metallic rods. The secondary shock waves in each rod move away from the impact tangent point where the airborne ballistic shock wave first intercepted the metallic sensor rod and travel in opposite directions toward the ends of the rod. Transducers located on the ends of the rod detect the shock waves in the metal rod and produce electrical signals which start and stop timing circuits. The relative time difference of the start and stop signals from the opposite ends of the rod sensor, coupled with the known velocity of sound in the metallic rod, allows calculation of the impact point on the linear rod. Each rod sensor, one vertical and one horizontal, acts independently of the other to produce one axis of the XY-coordinate grid which defines the target area. The intercept of the XY-coordinates defines the "hit" for a projectile which passes through that intercept point. The resulting "hit" data are displayed as digital numbers representing the distance from the target center or displayed in graphic form as a dot on a cathod ray tube screen.

A limitation of the system described in the Rohrbaugh said patent is the necessity for the vertical rod sensor to define one axis of the scoring grid in the target area. The vertical rod sensor is visible to the shooter, which makes camouflage of the target area very difficult when the target scoring system is employed for training with pop-up type targets. Also the vertical rod sensor is in the line of fire and can be damaged unless protected by armor plate. Such armor plate is unacceptable in most applications because of the weight and safety considerations from richocheting bullets.

PRIOR ART STATEMENT

The following patents are hereby referenced as being typical of the known prior art:
U.S. Pat. No. 2,916,289 R. Zito
U.S. Pat. No. 2,925,582 J. I. Mattei, et al
U.S. Pat. No. 2,934,346 T. Mongello
U.S. Pat. No. 2,973,964 R. Zito
U.S. Pat. No. 3,022,076 R. Zito
U.S. Pat. No. 3,217,290 U. C. I. Sillman
U.S. Pat. No. 3,392,979 N. G. Wilska
U.S. Pat. No. 3,479,032 J. A. I. Ohlund, et al
U.S. Pat. No. 3,778,059 G. W. Rohrbaugh, et al
U.S. Pat. No. 4,261,579 W. H. Bowyer, et al

OBJECT OF THE INVENTION

The main object of this invention is to provide an acoustic target scoring system based on a new rod sensor configuration of nonperpendicular curved rod sensors which define a scoring grid based on the intercept of the radial lines from the center of curvature of each curved rod through the tangent impact point (acoustic score point) on each rod.

Another object of the invention is to produce a large target scoring area by utilizing curved rod sensors which effectively produce fanshaped intersecting grid lines radiating from the centers of curvature of the rod sensors.

Another object of the invention is to provide curved rod sensors which can be located below the target scoring area behind a protective barrier and out of the line of fire of passing projectiles.

Another object of the invention is to provide very large target scoring areas as would be needed for moving targets by using many curved rod sensors of full semicircular shape arranged in a line to form a long target produced by the overlapping fan-shaped scoring areas of the individual rod sensors.

Another object of the invention is to produce a curved rod sensor acoustically mounted in a protective concentric tube which is slotted to allow passage of the ballistic shock wave from the supersonic projectile.

BRIEF DESCRIPTION OF THE DRAWINGS

FIG. 4 is a cross-sectional longitudinal view of the curved rod sensor and protective tube utilized by the invention.

FIG. 5 is a cross-sectional view taken along 5—5 of FIG. 4.

DESCRIPTION OF THE PREFERRED EMBODIMENT

The proposed invention is based on the principle that a projectile or bullet exceeding the speed of sound in air creates an acoustic shock wave which expands away from the line of flight of the bullet. As the bullet moves, the airborne shock wave appears as an expanding cone of high-energy acoustic activity which can be detected by piezoelectric transducer devices which operate to produce an electrical signal when struck by the acoustic shock wave. By placing the transducers on the ends of metal rods, and arranging the rod sensors around a target scoring area, the location of the supersonic projectile can be calculated by measuring the time of arrival of the metalborne shock wave at the ends of the rods. The metal rod sensors of the proposed invention are curved and placed on one side of a target area to produce overlapping fan-shaped detection grids.

Figure 1:
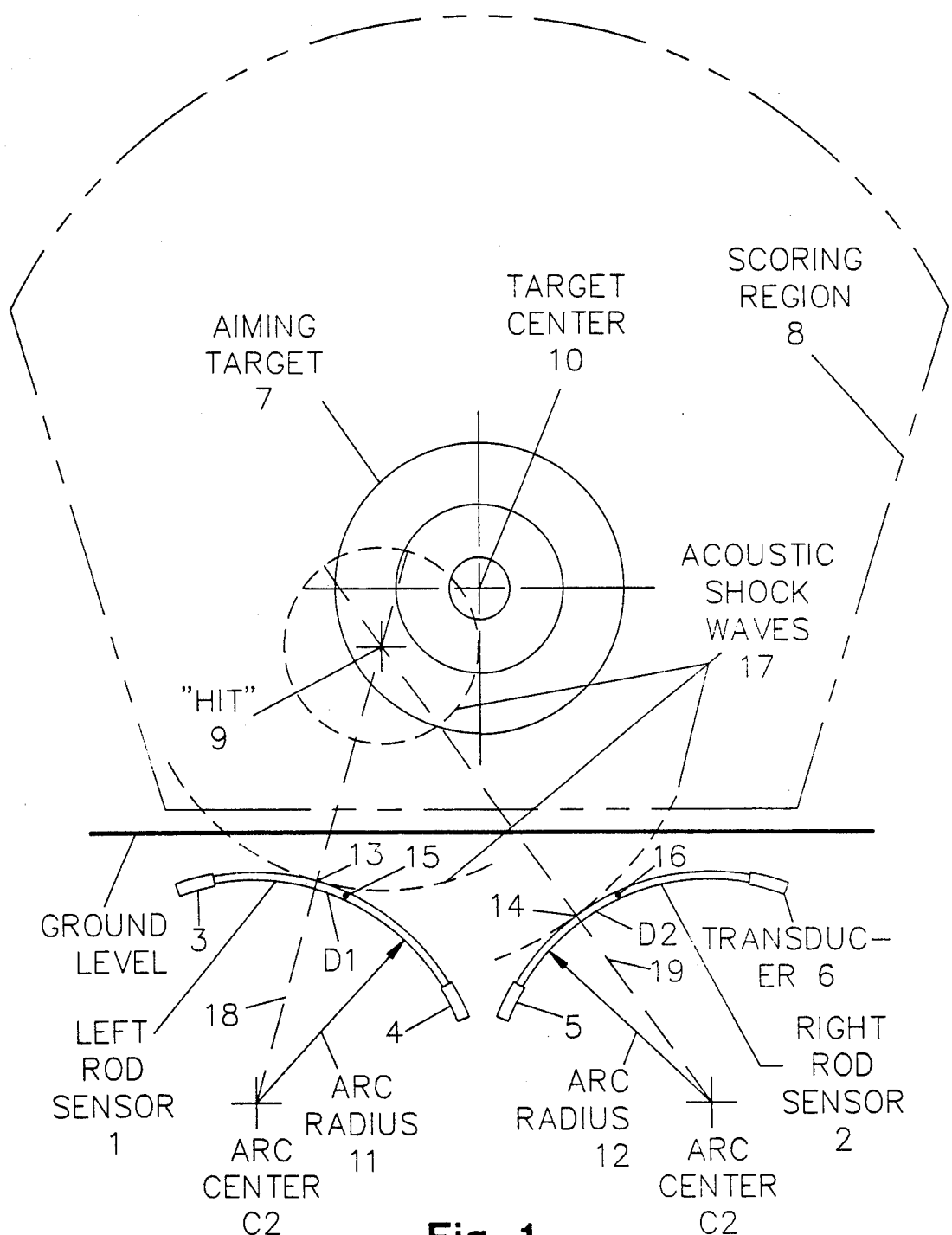
FIG. 1 is a diagram partially diagramatic showing a front view of the preferred embodiment of the invention where two curved rod sensors are placed below the target scoring region.

Direct your attention to the preferred embodiment of the invention as shown in FIG. 1. Two curved rod sensors 1 (left) and 2 (right) are arranged in a plane below the target scoring region 8 and intercept the acoustic wave 17 from a projectile passing through the "hit" point 9.

Rod sensors 1 (left) and 2 (right) are circular in shape (arc of a circle); although it is within the contemplation of this invention that other mathematical curves may be used, such as a catenary, parabola, hyperbola or complex curves. Likewise the rod sensors may be made of material such as aluminum, iron, steel, brass, etc. The rod sensors may be constructed of nonmetallic acoustic transmitting materials such as glass, ceramic and the like.

An aiming target 7 with target center 10 is located in the scoring region 8 and referenced to the scoring grid of the curved rods. The left rod sensor 1 forms an arc of a circle having a center C1 and a radius of curvature 11. The right rod sensor 2 forms an arc of a circle having a center C2 and a radius of curvature 12. The metallic rod sensors 1 and 2 each have piezoelectric transducers on both ends. Transducers 3 and 4 are attached to the left rod sensor 1 and transducers 5 and 6 are attached to the right rod sensor 2. The length of the rod sensor arc, the radius of curvature of the arc, and the distance between the arc centers C1 and C2 are physical parameters chosen to define the size and position of the target scoring region 8. These same parameters are used in the calculation of the straight-line equations which pass through the arc centers C1 and C2, the tangent scoring points on the rod sensors at 13 and 14, and the "hit" point 9.

In operation, the expanding acoustic shock wave 17 from a passing projectile appears as a series of expanding circles in the plane of the target with the center of the circles at the bullet's "hit" point 9. The expanding shock wave first strikes rod sensor 1 at a tangent point 13 and a short time later intercepts rod sensor 2 at tangent point 14. The secondary acoustic shock waves in the metal rod sensor 1 travel away from the tangent point 13 toward the rod ends at the speed of sound in the metal and excite transducers 3 and 4. Transducer 3 is closer to the impact tangent point 13 and is the first to produce an electrical signal which is used to start an electronic scoring circuit 71 shown in FIG. 2. When transducer 4 is excited by the metalborne shock wave in rod sensor 1 the electrical signal is used to stop the left scoring circuit 71. The distance D1 from the tangent point 13 to the rod midpoint 15 is calculated using the simple equation $$D1 = (T1 - T2)V/2$$

where $T1 - T2$ is the time difference between the start and stop timing signals from rod sensor 1 and $V$ is the velocity of sound in the left rod sensor 1. The rod sensor score value D1 at 13 and the arc center C1 define a straight line 18 which passes through the "hit" point 9 and forms one grid line in the target scoring region 8.

Figure 2:
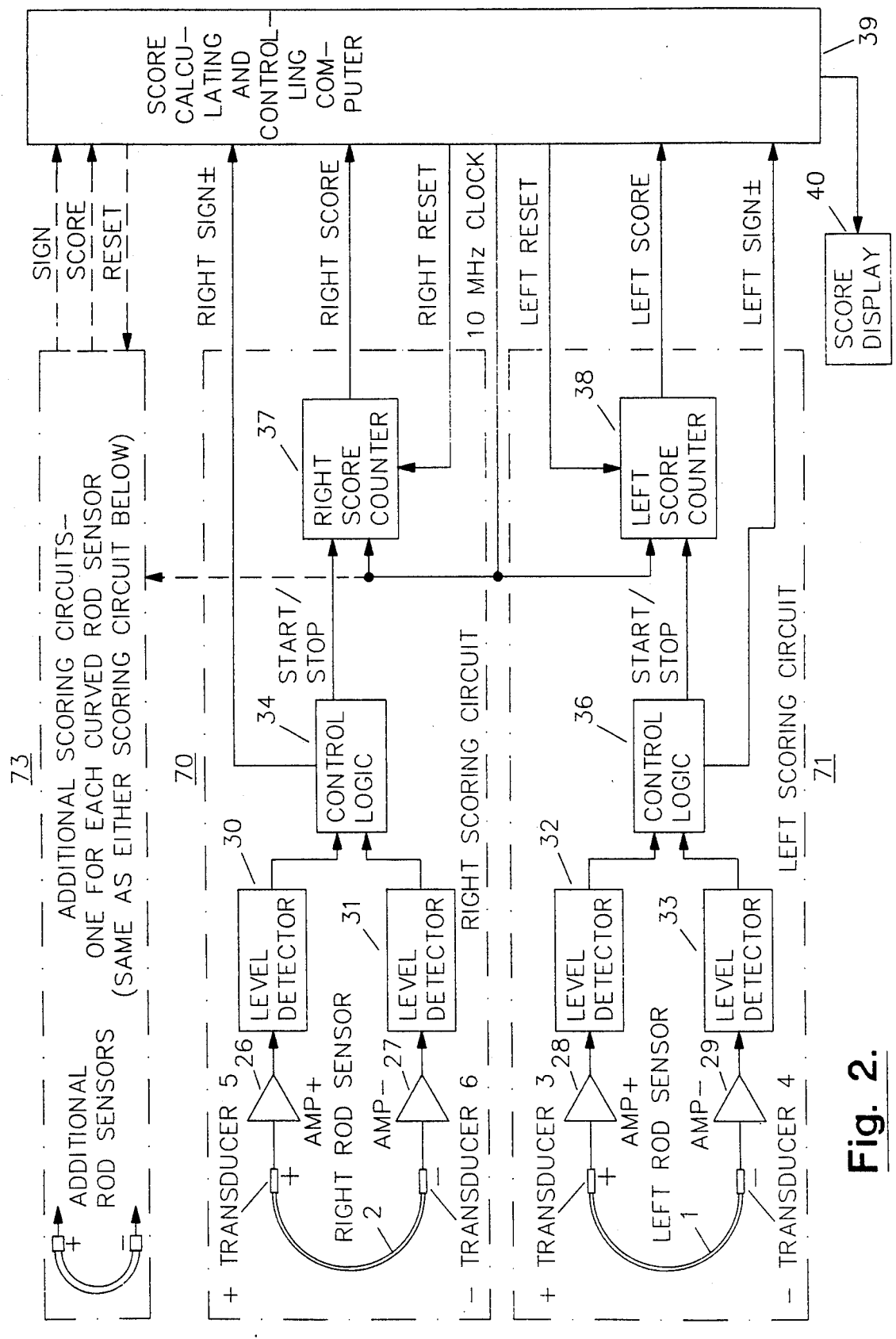
FIG. 2 is a diagramatic block diagram of the electronic circuitry required for the automatic target scoring apparatus of the preferred embodiment of the invention, with connection to additional scoring circuits used with the moving target system of FIG. 3.

In a similar manner the right rod sensor 2 produces the necessary second grid line 19 as follows. The acoustic shock wave 17 strikes the right rod sensor 2 at a tangent point 14 and produces secondary acoustic shock waves in the right rod sensor 2. The secondary waves in the right rod sensor 2 (which may be composed of metal) move away from the tangent point 14 toward the ends of the right rod sensor 2 at the speed of sound in the rod and excite transducers 5 and 6. Transducer 5 is closer to the tangent point 14 and is the first to produce an electrical signal which is used to start an electronic scoring circuit 70 as shown in FIG. 2. A short time later transducer 6 is struck by the secondary shock wave in rod sensor 2 and produces an electrical signal which is used to stop the right scoring circuit 70. The distance D2 from the tangent point 14 to the rod midpoint 16 is calculated using the equation $$D2 = (T1 - T2)V/2$$

where $T1 - T2$ is the time difference between the start and stop signals from right rod sensor 2 and $V$ is the velocity of sound in the right rod sensor 2. The rod sensor score value D2 at 14 and the arc center C2 define a straight line 19 which passes through the "hit" point 9 and forms the second grid line in the target scoring region 8. The XY-coordinates of the "hit" are thus defined by the intercept of the two straight lines 18 and 19.

Figure 3:
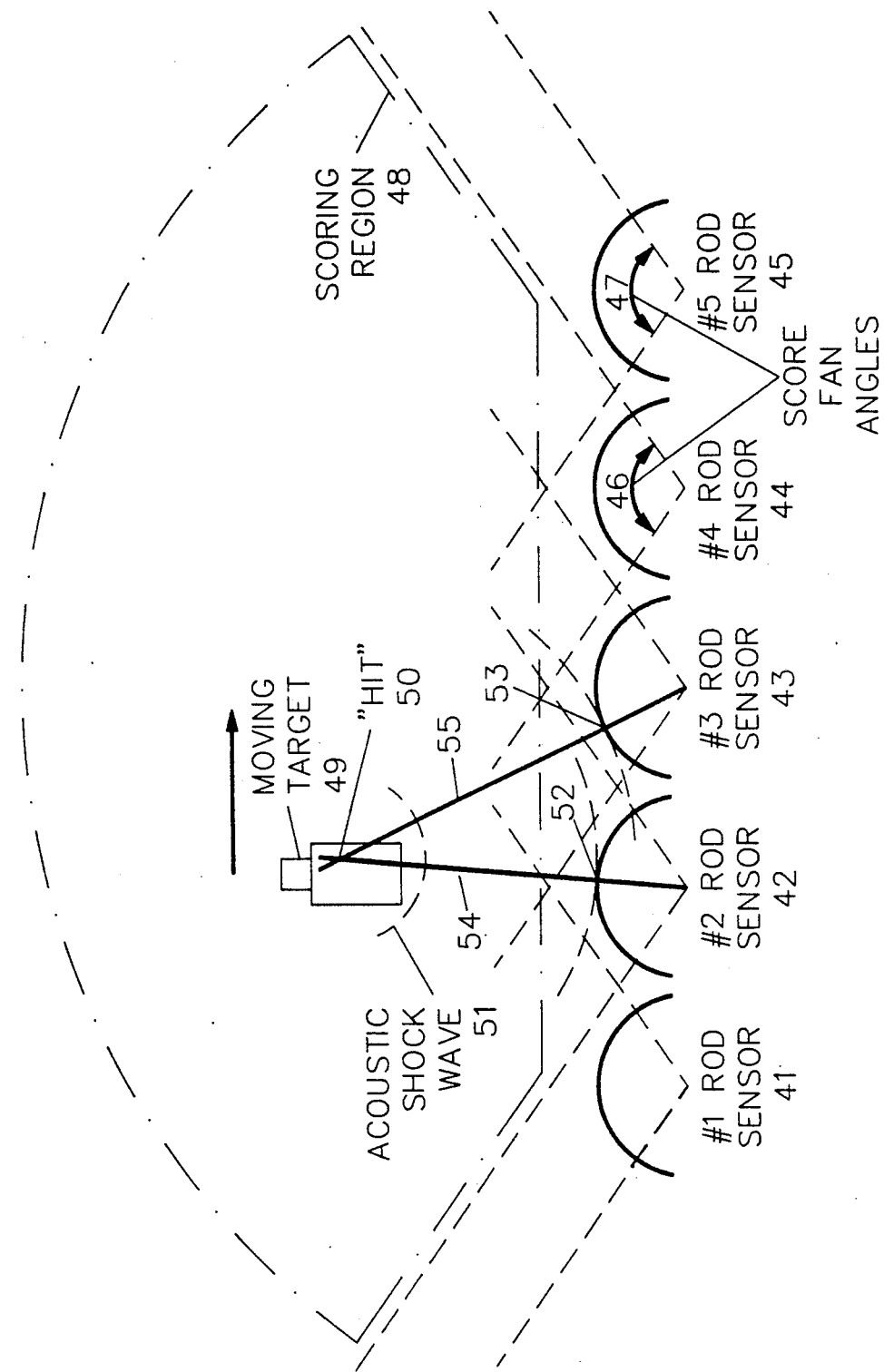
FIG. 3 is a diagramatic front view of a second embodiment of the invention showing an array of rod sensors with overlapping score fans which produce a large scoring region for a moving target.

FIG. 2 shows the electronic circuitry in block form for the preferred embodiment of the curved rod sensor target scoring apparatus. Additional scoring circuits 73 are not connected (dotted line) to the right score counter 37 and left score counter 38. Nor are the circuits designated SIGN, SCORE and RESET (dotted lines) connected between the additional scoring circuits and the score calculating and controlling computer 39. These circuits are connected (dotted line) only when the moving target device of FIG. 3 is in operation. The right rod sensor 2 with transducers 5 and 6 along with a mating left rod sensor 1 with transducers 3 and 4 are shown coupled to the electronic scoring circuitry 70 and 71 respectively. The plus (+) transducer 5 of the right rod sensor 2 is electrically connected to amplifier 26 where the electrical analog signal produced by the transducer 5 when struck by the acoustic shock wave 17 is amplified and filtered before passing to the level detector 30. In like manner the minus (−) transducer 6 of the right rod sensor 2 is connected to the amplifier 27 which is connected to level detector 31.

The level detectors 30 and 31 produce digital electrical pulses when the analog signal inputs reach the detection threshold level. The outputs from the level detectors 30 and 31 are fed into control logic circuitry 34 which determines the sign (+/−) of the right rod score and produces the start/stop gate signal for the connected right score counter 37. The start/stop signal gates a 10 MHz clock pulses from the computer 39 to the right score counter 37 where the digital score is accumulated. The right score value with sign (+ or −) is coupled to the score calculating and controlling computer 39. The computer 39 calculates the distance along the right rod sensor 2 from the midpoint using the time accumulated in the score counter 37 and the velocity of sound for the metal type used to fabricate the right rod sensor 2, e.g., aluminum. The direction from the midpoint is determined by the sign from the control logic 34. The controlling computer 39 resets the connected score counter 37 in preparation for the next shot after transferring the count to the memory of computer 39.

The left rod sensor 1 and associated scoring circuitry 71 operate independently of the right rod sensor 2 and right scoring circuitry 70. The plus (+) transducer 3 is connected to the analog signal amplifier 28 and the minus (−) transducer 4 is connected to amplifier 29. As with the right scoring circuitry 70, the amplified signals are amplitude detected by connected level detectors 32 and 33 to produce digital pulses which control the logic circuitry at 35. The control logic 35 generates the sign of the score and produces the start/stop gate for the connected left score counter 38. The start/stop signal gates the 10 MHz clock pulses from the computer 39 to the left score counter 38 where the digital score is accumulated. The left score value with sign (+ or −) is coupled to the score calculating and controlling computer 39 where the left rod score is calculated. A reset for the left score counter 38 is generated by the computer at the completion of the rod scoring cycle.

When both right and left rod scores have been transferred to the computer 39, the computer calculates the XY-coordinates for the impact point ("hit"). The coordinates of this intercept are determined by solving two straight line equations formed from the two rod score points and the two centers of the curvature as described in FIG. 1. Finally, the computer 39 outputs the XY-coordinates to a display device 40, such as a printer or electronic graphic display screen.

The score produced by a curved rod sensor is relative to the center point of the rod and is independent of rod length. Sensor rods of any length may be employed depending on the scoring requirements and size of the desired scoring region. In a similar manner, the radius of curvature of the sensor rod may vary depending on the size of scoring region and the desired scoring accuracy. The accuracy is a function of the rod radius and rod placement because the highest scoring accuracy is achieved when the scoring grid lines intersect as nearly perpendicular as possible at the "hit" point in the scoring region.

Curved rod sensors as long as 50 feet with a radius of curvature of 25 feet are envisioned for use with the target scoring system in order to produce a large scoring region. Short rods of two feet in length, curved on one-foot radii, might be used for a small scoring region encompassing a few square feet in area. Typically, a 30-foot-wide-by-15-foot-high scoring region can be produced with 10-foot-long rod sensors having 42-inch radii of curvature when the arc centers are spaced 8 feet apart. A six-foot-square scoring region results when 4-foot-long rods having 30-inch radii of curvature are used and the arc centers of the curved rods are spaced 5 feet apart.

DESCRIPTION OF AN ALTERNATE EMBODIMENT

A moving target scoring device is described in FIG. 3.

FIG. 3 shows multiple curved rod sensors 41 through 45 arrayed in a line to produce a large scoring region 48 as would be required to score a moving target 49. These rod sensors are of the same type as shown and described in FIG. 1 and FIG. 2. Any number of rod sensors may be employed in the array depending on the length of the desired scoring region. The five semi-circular rod sensors 41, 42, 43, 44 and 45 shown have overlapping score fans which effectively cover the scoring region. Two of the five score fan angles are depicted for rod sensors 44 and 45. The rod sensor 44 score fan angle 46 intercepts the 45 rod sensor score fan angle 47 to produce the scoring grid for the rightmost area of the scoring region 48. The rod sensor 44 score fan angle 46 also intercepts the fan for the rod sensor 43 and produces the scoring grid to cover the area between rod sensors 3 and 44 in the scoring region 48. Rod sensors 44 and 45 of FIG. 3 are identical to left rod sensor 1 and right rod sensor 2 of FIGS. 1 and 2. When the moving target configuration of FIG. 3 is used, additional scoring circuits 73 of FIG. 2 are connected as indicated by the dotted lines (FIG. 2) from the right scoring counter 37 and the score calculating computer 39 to the additional scoring circuits 73. Thus circuits designated SIGN, SCORE and RESET (dotted lines) are connected between additional scoring circuits 73 and the score calculating computer 39. In this case an additional scoring circuit identical to scoring circuit 70 or 71 is connected to each rod sensor 41, 42, 43, 44 and 45.

In FIG. 3 a projectile passing through the scoring region at the "hit" point 50 produces an acoustic shock wave 51 which strikes the two closest rod sensors 42 and 43 at the tangent points 52 and 53 respectively. Eventually, all five rod sensors will be struck by the acoustic shock wave. The scores from all five rod sensors could be used by the computer 39 to calculate the intercept at the "hit" point 50; however, only the first two scores from rod sensors 42 and 43 are needed. These first two scores are electronically selected by the computer 39 based on the time of the scoring event and used by the computer to calculate the straight lines 54 and 55 which intersect to define the "hit" 50. The same electronic scoring technique is employed for the moving target apparatus of FIG. 3 as was described for a two-rod stationary target in FIG. 2. Each additional rod sensor requires an additional electronic scoring circuit 73 which couples directly into the controlling and calculating computer as shown on FIG. 2. The final XY-coordinates for the scoring region 48 are generated by the calculating and controlling computer based on the location of each of the five rod sensors 41 through 45 and the "hit" score values from the two closest rod sensors.

FIGS. 4 and 5 show the preferred design for mounting and protecting the left rod sensor 1 inside a curved concentric protective tube 56 which is slotted to produce an entry opening 60 for the acoustic shock wave from a passing supersonic projectile. The cutaway view of the left end of the rod/tube assembly in FIG. 4 shows the left rod sensor 1 with transducer 3 held inside the protective metal tube 56 by rubber mount 59. Although rubber is used as a mount 59, it is within the contemplation of the invention that other acoustic insulation materials may also be used without departing from the spirit of the invention. Likewise, protective tube 56 may be made of metal although other non-metallic substances may be used. Multiple rubber mounts identical to rubber mount 59 assure alignment of the rod sensor with the protective tube 56 and keep unwanted acoustic energy from reaching the rod sensor 1 through the walls of the protective tube 56. The slot opening 60 which is milled along the length of the protective tube 56 allows the acoustic shock wave 17 (FIG. 1) to reach the left rod sensor 1 from a predetermined direction only. The shock wave path 61 is determined by the shock wave cone angle which is a function of the velocity of the projectile. FIG. 5 is a cross-section of the rod/tube assembly of FIG. 4 and shows the relationship of the left rod sensor 1, the rubber mount 59, the protective tube 56, and the slot opening 60.

I claim:

1. An automatic target scoring apparatus for use with moving targets responsive to the airborne first acoustic shock wave of a supersonic projectile for determining the "hit" location at which the projectile passed through the predetermined target area of the moving target, comprising in combination:
    an array comprised of two acoustical projectile detection devices, each comprising a first and a second curved acoustic energy translation rod, each translation rod positioned adjacent to the path of said moving target and adapted to intercept said first acoustic shock wave of said supersonic projectile and to transmit through said translation rod a secondary acoustic shock wave, each first and second curved acoustical energy translation device being responsive to an acoustical scoring region in the path of said moving target;
    acoustic transducers mounted one on each end portion of each of said curved acoustic energy translation rods in said array, each transducer being respectively responsive to the said secondary acoustic shock waves in said translation rods to produce an electrical output signal, said electrical output signal of each pair of said acoustic transducers having a timed relationship of the difference in arrival times of the said secondary acoustic shock wave at the respective acoustic transducers;
    independent electrical circuit means coupled to each pair of said transducers positioned upon said first and said second curved acoustic energy translation rods said circuit being responsive to the electrical signals of the said transducers and providing an output signal which is the measure of the difference in arrival times of said secondary acoustic shock wave through each energy translation rod;
    computer means coupled to each electrical circuit means to receive the said time difference of arrival signals produced by each of said acoustic energy translation rods whereby the position of the said supersonic projectile passing through said target area is calculated as the intercept of two straight lines where the first straight line is defined as passing through two points where the first point is the tangent point of contact between said airborne first acoustic shock wave and the first energy translation rod and the second point is the center of curvature point for said first energy translation rod, and the second straight line is defined as passing through two additional points where the first point is the tangent point of contact between said airborne first acoustic shock wave and the second energy translation rod and the second point is the center of curvature point for said second energy translation rod, both rods being in a row to be struck by said airborne acoustic shock wave;
    a display means connected to said computer means adapted to represent the "hit" position determined by said computer.

2. The combination as claimed in claim 1, where each first and second curved energy translation rods of each said acoustical projectile detection device is positioned a selected distance from the adjacent curved energy translation rods of the adjacent acoustical device so that the scoring regions of adjacent projectile detection devices overlap.

3. The combination as claimed in claim 2, in which said array is comprised of more than two acoustical projectile detection devices, each positioned in a row along the path of said moving target.

4. The combination as claimed in claim 3, in which said independent electrical circuit means is comprised of, in combination:
    a level amplifier means connected to each of said first and second transducers;
    a control logic circuit connected to said level amplifier means;
    a score counter connected to said control logic circuit and to said computer means.

5. The combination as claimed in claim 4, in which said computer means is comprised of, in combination:
    means to receive the time difference of arrival signals produced by each of said transducers, said computer means adapted to compute the position of said supersonic projectile by the calculation of the intercept of two straight lines utilizing the formula $D=(T1-T2)V/2$ for determining the tangent point of contact between the said primary acoustic shock wave and the said curved acoustic energy translation rod where D is the distance along the acoustic energy translation rod, $T1-T2$ is the difference in arrival times of the secondary acoustic shock wave in the said rod and V is the velocity of sound through said rod where each said straight line is defined as passing through said tangent point D and the center of curvature point for the curved acoustic energy translation rod.

6. The combination as claimed in claim 5, in which said electrical circuit means is comprised of, in combination:

a pair of first and second amplifiers connected to said acoustic transducers mounted upon the end portion of said first and said second curved acoustical energy translation rods;

a pair of first and second level detectors connected to said first and said second pair of amplifiers respectively;

a first and second control logic circuit connected to said first and said second pair of level detectors;

first and second score counters connected to said first and said second control logic circuits respectively;

said computer means connected to the output of said first and said second score counters respectively and to said first and said second control logic circuits respectively.

* * * * *